US012767209B2

(12) United States Patent
Hasegawa et al.

(10) Patent No.: US 12,767,209 B2
(45) Date of Patent: Oct. 20, 2026

(54) VEHICLE CONTROL DEVICE

(71) Applicants: JTEKT CORPORATION, Kariya (JP); TOYOTA JIDOSHA KABUSHIKI KAISHA, Toyota (JP); DENSO CORPORATION, Kariya City (JP)

(72) Inventors: Kazuma Hasegawa, Anjo (JP); Kenichi Abe, Okazaki (JP); Yuuta Kajisawa, Okazaki (JP); Takashi Koudai, Okazaki (JP); Kaishi Monobe, Toyota (JP); Mika Ikeya, Okazaki (JP); Masaharu Yamashita, Toyota (JP); Kenji Shibata, Nagoya (JP); Yosuke Yamashita, Nagoya (JP); Kazuaki Iida, Gotenba (JP); Shintaro Takayama, Toyota (JP); Nobuyori Nakajima, Kariya City (JP); Toyohiro Hayashi, Kariya City (JP)

(73) Assignees: JTEKT CORPORATION, Kariya (JP); TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 113 days.

(21) Appl. No.: 18/670,387

(22) Filed: May 21, 2024

(65) Prior Publication Data

US 2024/0400125 A1 Dec. 5, 2024

(30) Foreign Application Priority Data

May 29, 2023 (JP) ................................ 2023-087955

(51) Int. Cl.
*B62D 5/00* (2006.01)
*B62D 5/04* (2006.01)

(52) U.S. Cl.
CPC ............ *B62D 5/005* (2013.01); *B62D 5/046* (2013.01); *B62D 5/0409* (2013.01)

(58) Field of Classification Search
CPC ...... B62D 5/005; B62D 5/046; B62D 5/0409; B62D 5/0481
See application file for complete search history.

(56) References Cited

U.S. PATENT DOCUMENTS

| | | | | |
|---|---|---|---|---|
| 10,666,179 | B2 | 5/2020 | Nakamura et al. | |
| 2020/0207408 | A1* | 7/2020 | Nakamura | B62D 5/049 |
| 2022/0258794 | A1 | 8/2022 | Takesaki et al. | |

FOREIGN PATENT DOCUMENTS

| | | | | |
|---|---|---|---|---|
| CN | 109757126 A * | 5/2019 | | H02P 21/24 |
| DE | 102019117222 A1 * | 12/2020 | | B62D 5/005 |

(Continued)

OTHER PUBLICATIONS

Machine Translation of JP 2021078340 A PDF File Name: "JP2021078340A_Machine_Translation.pdf" (Year: 2021).*

(Continued)

*Primary Examiner* — Grant Moubry
*Assistant Examiner* — Ruben Picon-Feliciano
(74) *Attorney, Agent, or Firm* — Oliff PLC

(57) ABSTRACT

Each control circuit of a control device for a vehicle drives a motor in one of driving modes that are switched according to an operation state of the control circuit of a system other than an own system. The driving modes include an own-system shutdown mode in which the power supply to a winding set of the own system is stopped when the operation state of the control circuit of a system other than the own system is abnormal. Even when the operation state of the control circuit of a system other than the own system is abnormal, each control circuit does not shift the driving mode to the own-system shutdown mode when an own (Continued)

operation state is a specific operation state in which safety problems are deemed unlikely.

10 Claims, 7 Drawing Sheets

(56) References Cited

FOREIGN PATENT DOCUMENTS

| | | | | |
|---|---|---|---|---|
| EP | 4 166 423 | A2 | | 4/2023 |
| JP | 2021-075182 | A | | 5/2021 |
| JP | 2021078340 | A | * | 5/2021 |

OTHER PUBLICATIONS

Machine Translation of DE 102019117222 A1 PDF File Name: "DE102019117222A1_Machine_Translation.pdf" (Year: 2020).*
Machine Translation of CN 109757126 A PDF File Nmae: "CN109757126A_Machine_Translation.pdf" (Year: 2019).*
Feb. 5, 2025 extended Search Report issued in European Patent Application No. 24177648.3.

* cited by examiner

VEHICLE CONTROL DEVICE

CROSS-REFERENCE TO RELATED APPLICATION

This application claims priority to Japanese Patent Application No. 2023-087955 filed on May 29, 2023, incorporated herein by reference in its entirety.

BACKGROUND

1. Technical Field

The present disclosure relates to a vehicle control device.

2. Description of Related Art

Conventionally, the following vehicle control device is known. For example, the motor driving system of Japanese Unexamined Patent Application Publication No. 2021-075182 (JP 2021-075182 A) has a reaction force actuator that generates a reaction force torque and a turning actuator that generates a turning torque. Each of the reaction force actuator and the turning actuator functions as a motor and has winding sets of two systems. Each of the reaction force actuator and the turning actuator has motor driving units of the two systems and control arithmetic units of the two systems. Each control arithmetic unit controls a current applied to the windings of the own system through the motor driving unit of the own system.

The control arithmetic units of the respective systems can communicate with each other. The control arithmetic units have a coordinated driving mode, a restorable mode, and a failure-confirmed mode. The coordinated driving mode is a driving mode in which the control arithmetic unit of the own system and the control arithmetic unit of the other system commonly use information that is exchanged therebetween through communication. The restorable mode is a driving mode in which, when an abnormality occurs in one of the control arithmetic units of the two systems, and there is a possibility for the control arithmetic unit of the abnormal system to be restored to normal, the control arithmetic unit of the normal system does not use the information acquired from the control arithmetic unit of the abnormal system. The failure-confirmed mode is a driving mode in which, when failure of one of the control arithmetic units of the two systems is confirmed, the control arithmetic unit of the normal system makes the corresponding motor driving unit generate a torque.

SUMMARY

The vehicle control device like JP 2021-075182 A raises the following concern. For example, there is a concern that an abnormality may occur that makes it difficult to appropriately control the reaction force actuator and the turning actuator, depending on the operation states or the control specifications of the control arithmetic units. The vehicle control device is required to respond appropriately in the event of an abnormality.

A vehicle control device according to one aspect of the present disclosure includes a plurality of control circuits of a plurality of systems each configured to calculate a current command value according to a torque to be generated by a motor that has winding sets of the plurality of systems, and to independently control power supply to the winding set of a corresponding one of the plurality of systems based on the calculated current command value. The control circuits are each configured to drive the motor in one of driving modes that are switched according to an operation state of the control circuit of a system other than an own system. The driving modes include an own-system shutdown mode in which the power supply to the winding set of the own system is stopped when the operation state of the control circuit of a system other than the own system is abnormal. The control circuits are each configured such that, even when the operation state of the control circuit of a system other than the own system is abnormal, the control circuit does not shift the driving mode to the own-system shutdown mode when an own operation state is a specific operation state in which safety problems are deemed unlikely.

According to this configuration, even when the operation state of the control circuit of a system other than the own system is abnormal, each control circuit does not shift the driving mode to the own-system shutdown mode when the own operation state is the specific operation state in which safety problems are deemed unlikely, for example, the probabilities of security problems are close to zero. Therefore, each control circuit can appropriately respond to an abnormality of the control circuit of a system other than the own system according to the own operation state.

In the above-described vehicle control device, the control circuits may be each configured to execute a start-up process and an initial check as a vehicle power source is turned on, and to monitor the operation state of the control circuit of a system other than the own system from a viewpoint of controlling the driving of the motor in synchronization with the control circuit of the other system. In this case, the specific operation state may be a state of executing the start-up process or the initial check.

As in this configuration, safety problems are deemed unlikely during execution of the start-up process and the initial check. Therefore, even when the operation state of the control circuit of a system other than the own system is abnormal, the driving mode can be prevented from shifting to the own-system shutdown mode.

In the above-described vehicle control device, the plurality of control circuits may be configured to synchronize the driving modes with one another, and to communicate with a vehicle controller configured to control a vehicle. In this case, the control circuits may be each configured such that, when, while the control circuit is controlling the driving of the motor, the operation state of the control circuit of a system other than the own system is abnormal, the control circuit shifts the driving mode to the own-system shutdown mode, and such that, when the driving modes of the plurality of control circuits have all shifted to the own-system shutdown mode through the synchronization, the control circuit transmits a notification signal showing that effect to the vehicle controller.

According to this configuration, when, while the driving of the motor is controlled, the driving modes of the plurality of control circuits have all shifted to the own-system shutdown mode, the notification signal showing that effect is transmitted to the vehicle controller. Therefore, the vehicle controller can recognize, based on the notification signal, that the motor is being difficult to drive.

In the above-described vehicle control device, the motor may include a reaction force motor that has winding sets of two systems and is configured to generate a steering reaction force to be applied to a steering wheel from which power transmission to a turning wheel is cut off, and a turning motor that has winding sets of two systems and is configured to generate a turning force for turning the turning wheel. In this case, the plurality of control circuits may include a first reaction force control circuit configured to control power supply to the reaction force motor, a second reaction force control circuit configured to control the power supply to the reaction force motor, a first turning control circuit configured to control power supply to the turning motor, and a second turning control circuit configured to control the power supply to the turning motor. Further, in this case, the first reaction force control circuit and the first turning control circuit may be in a relationship of monitoring each other's operation state, while the second reaction force control circuit and the second turning control circuit may be in a relationship of monitoring each other's operation state.

According to this configuration, even when the operation state of the first turning control circuit that is the control circuit of the system other than the own system is abnormal, the first reaction force control circuit does not shift the driving mode to the own-system shutdown mode when the own operation state is the specific operation state in which safety problems are deemed unlikely. Therefore, the first reaction force control circuit can appropriately respond to an abnormality of the first turning control circuit according to the own operation state. Even when the operation state of the first reaction force control circuit that is the control circuit of the system other than the own system is abnormal, the first turning control circuit does not shift the driving mode to the own-system shutdown mode when the own operation state is the specific operation state in which safety problems are deemed unlikely. Therefore, the first turning control circuit can appropriately respond to an abnormality of the first reaction force control circuit according to the own operation state. The same applies to the second reaction force control circuit and the second turning control circuit.

In the above-described vehicle control device, the motor may include a reaction force motor that has a winding set of one system and is configured to generate a steering reaction force to be applied to a steering wheel from which power transmission to a turning wheel is cut off, and a turning motor that has a winding set of one system and is configured to generate a turning force for turning the turning wheel. In this case, the plurality of control circuits may include a reaction force control circuit configured to control power supply to the reaction force motor, and a turning control circuit configured to control power supply to the turning motor.

According to this configuration, even when the operation state of the turning control circuit that is the control circuit of the system other than the own system is abnormal, the reaction force control circuit does not shift the driving mode to the own-system shutdown mode when the own operation state is the specific operation state in which safety problems are deemed unlikely. Therefore, the reaction force control circuit can appropriately respond to an abnormality of the turning control circuit according to the own operation state. Even when the operation state of the reaction force control circuit that is the control circuit of the system other than the own system is abnormal, the turning control circuit does not shift the driving mode to the own-system shutdown mode when the own operation state is the specific operation state in which safety problems are deemed unlikely. Therefore, the turning control circuit can appropriately respond to an abnormality of the reaction force control circuit according to the own operation state.

In the above-described vehicle control device, the motor may be an assistance motor configured to generate an assistive force for assisting operation of a steering wheel. In this case, the assistance motor may have a winding set of a first system and a winding set of a second system. Further, in this case, the plurality of control circuits may include a first assistance control circuit configured to control power supply to the winding set of the first system, and a second assistance control circuit configured to control power supply to the winding set of the second system.

According to this configuration, even when the operation state of the second assistance control circuit that is the control circuit of the system other than the own system is abnormal, the first assistance control circuit does not shift the driving mode to the own-system shutdown mode when the own operation state is the specific operation state in which safety problems are deemed unlikely. Therefore, the first assistance control circuit can appropriately respond to an abnormality of the second assistance control circuit according to the own operation state. Even when the operation state of the first assistance control circuit that is the control circuit of the system other than the own system is abnormal, the second assistance control circuit does not shift the driving mode to the own-system shutdown mode when the own operation state is the specific operation state in which safety problems are deemed unlikely. Therefore, the second assistance control circuit can appropriately respond to an abnormality of the first assistance control circuit according to the own operation state.

The vehicle control device of the present disclosure can respond appropriately in the event of an abnormality.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
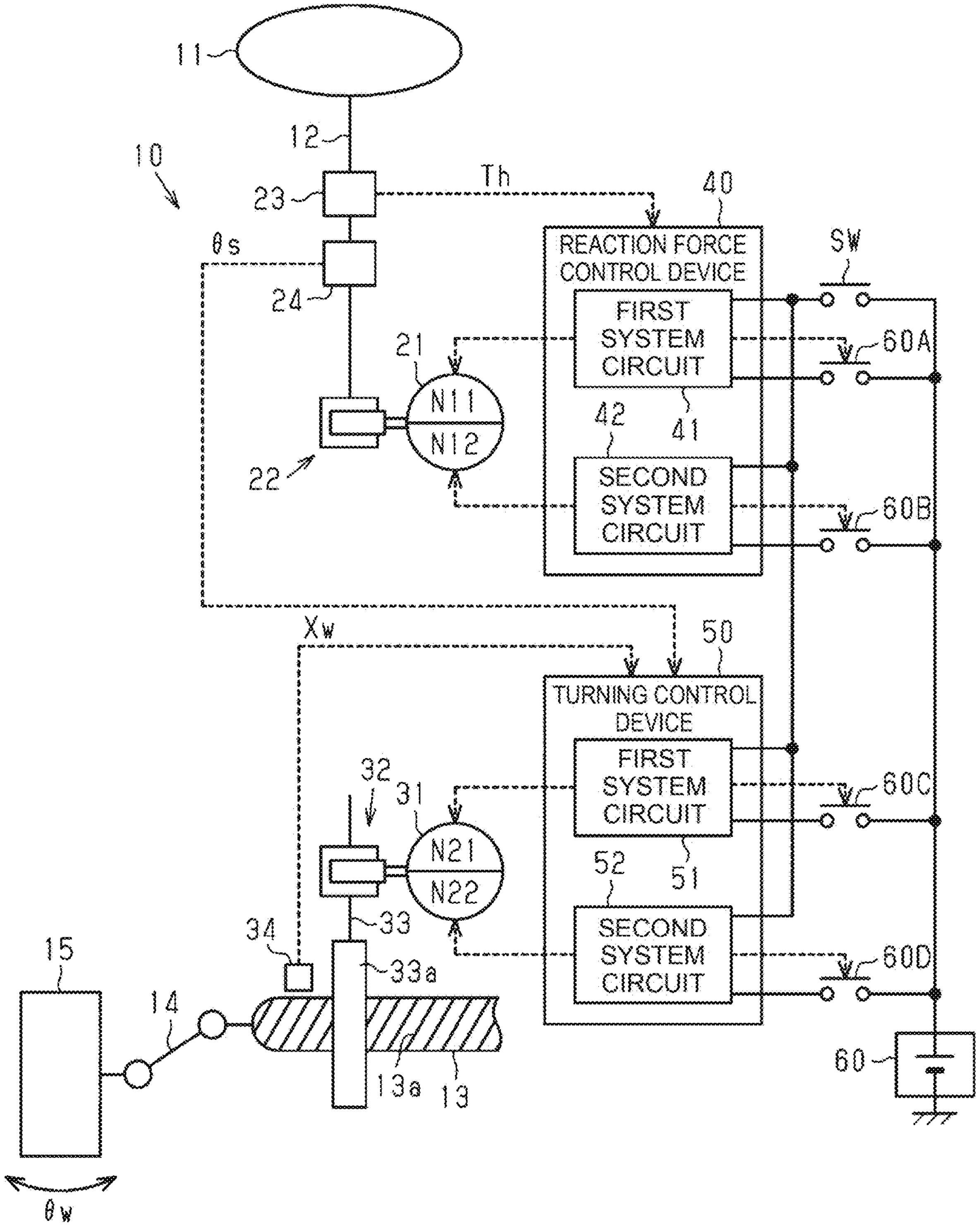
FIG. 1 is a configuration diagram of a steer-by-wire steering device in which a first embodiment of a vehicle control device is installed.

A first embodiment in which a vehicle control device is embodied as a steer-by-wire steering device will be described below. As shown in FIG. 1, a steering device 10 of a vehicle has a steering shaft 12 that is coupled to a steering wheel 11. The steering device 10 has a turning shaft 13 that extends along a vehicle width direction (the left-right direction in FIG. 1). At both ends of the turning shaft 13, turning wheels 15 are respectively coupled through tie rods 14. As the turning shaft 13 performs a linear movement, a turning angle θw of the turning wheels 15 is changed. However, power transmission from the turning shaft 13 to the steering shaft 12 is cut off. The steering shaft 12 and the turning shaft 13 constitute a steering mechanism of the vehicle. In FIG. 1, only the turning wheel 15 on one side is shown.

The steering device 10 has a reaction force motor 21 and a speed reduction mechanism 22. The reaction force motor 21 is a generation source of a steering reaction force. The steering reaction force refers to a force that acts in the opposite direction from a direction in which a driver operates the steering wheel 11. A rotating shaft of the reaction force motor 21 is coupled to the steering shaft 12 through the speed reduction mechanism 22. A torque of the reaction force motor 21 is applied to the steering shaft 12 as the steering reaction force. Applying the steering reaction force to the steering wheel 11 can give the driver just the right amount of steering feedback.

The reaction force motor 21 is, for example, a three-phase brushless motor. The reaction force motor 21 has a winding set N11 of a first system and a winding set N12 of a second system. The winding set N11 of the first system and the winding set N12 of the second system are wound around a common stator (not shown). The winding set N11 of the first system and the winding set N12 of the second system are equivalent to each other in electrical characteristics.

The steering device 10 has a turning motor 31 and a speed reduction mechanism 32. The turning motor 31 is a generation source of a turning force. The turning force refers to motive power for turning the turning wheels 15. A rotating shaft of the turning motor 31 is coupled to a pinion shaft 33 through the speed reduction mechanism 32. Pinion teeth 33*a* of the pinion shaft 33 are meshed with rack teeth 13*a* of the turning shaft 13. A torque of the turning motor 31 is applied as the turning force to the turning shaft 13 through the pinion shaft 33. As the turning motor 31 rotates, the turning shaft 13 moves along the vehicle width direction.

The turning motor 31 is, for example, a three-phase brushless motor. The turning motor 31 has a winding set N21 of a first system and a winding set N22 of a second system. The winding set N21 of the first system and the winding set N22 of the second system are wound around a common stator (not shown). The winding set N21 of the first system and the winding set N22 of the second system are equivalent to each other in electrical characteristics.

The steering device 10 has a reaction force control device 40. The reaction force control device 40 controls driving of the reaction force motor 21 that is a control target. The reaction force control device 40 executes reaction force control that makes the reaction force motor 21 generate the steering reaction force according to a steering torque Th. The reaction force control device 40 calculates a target steering reaction force based on the steering torque Th that is detected through a torque sensor 23. The torque sensor 23 is provided on the steering shaft 12. The reaction force control device 40 controls power supply to the reaction force motor 21 such that an actual steering reaction force applied to the steering shaft 12 matches the target steering reaction force. The reaction force control device 40 controls the power supply to the winding sets of the two systems in the reaction force motor 21, for each system independently.

The reaction force control device 40 has a first system circuit 41 and a second system circuit 42. The first system circuit 41 controls the power supply to the winding set N11 of the first system in the reaction force motor 21 according to the steering torque Th detected through the torque sensor 23. The second system circuit 42 controls the power supply to the winding set N12 of the second system in the reaction force motor 21 according to the steering torque Th detected through the torque sensor 23.

The steering device 10 has a turning control device 50. The turning control device 50 controls driving of the turning motor 31 that is a control target. The turning control device 50 executes turning control that makes the turning motor 31 generate the turning force for turning the turning wheels 15 according to a steering state. The turning control device 50 takes in a steering angle θs that is detected through a steering angle sensor 24 and a stroke Xw of the turning shaft 13 that is detected through a stroke sensor 34. The stroke Xw is an amount of shift of the turning shaft 13 with respect to a neutral position thereof, and is a state variable reflecting the turning angle θw. The steering angle sensor 24 is provided on the steering shaft 12, between the torque sensor 23 and the speed reduction mechanism 22. The stroke sensor 34 is provided near the turning shaft 13.

The turning control device 50 calculates a target turning angle of the turning wheels 15 based on the steering angle θs detected through the steering angle sensor 24. The turning control device 50 calculates the turning angle θw based on the stroke Xw of the turning shaft 13 detected through the stroke sensor 34. The turning control device 50 controls power supply to the turning motor 31 such that the turning angle θw calculated based on the stroke Xw matches the target turning angle. The turning control device 50 controls the power supply to the winding sets of the two systems in the turning motor 31, for each system independently.

The turning control device 50 has a first system circuit 51 and a second system circuit 52. The first system circuit 51 controls the power supply to the winding set N21 of the first system in the turning motor 31 based on the steering angle θs detected through the steering angle sensor 24 and the stroke Xw of the turning shaft 13 detected through the stroke sensor 34. The second system circuit 52 controls the power supply to the winding set N22 of the second system in the turning motor 31 based on the steering angle θs detected through the steering angle sensor 24 and the stroke Xw of the turning shaft 13 detected through the stroke sensor 34.

The reaction force control device 40 and the reaction force motor 21 may be provided as one unit to constitute a so-called integral mechano-electric reaction force actuator. The turning control device 50 and the turning motor 31 may be provided as one unit to constitute a so-called integral mechano-electric turning actuator.

Power Supply Paths

Next, power supply paths to the reaction force control device 40 and the turning control device 50 will be described. Various on-board control devices, including the reaction force control device 40 and the turning control device 50, are each supplied with electric power from a direct-current power source 60 installed in the vehicle. The direct-current power source 60 is, for example, a battery. Various sensors, including the torque sensor 23, the steering angle sensor 24, and the stroke sensor 34, are also each supplied with electric power from the direct-current power source 60.

The first system circuit 41 and the second system circuit 42 of the reaction force control device 40 as well as the first system circuit 51 and the second system circuit 52 of the turning control device 50 are each connected to the direct-current power source 60 through a start switch SW of the vehicle. The start switch SW is, for example, an ignition switch or a power switch. The start switch SW is operated to start or stop a travel driving source of the vehicle, such as an engine. When the start switch SW is turned on, the electric power from the direct-current power source 60 is supplied through the start switch SW to each of the first system circuit 41 and the second system circuit 42 of the reaction force control device 40 as well as the first system circuit 51 and the second system circuit 52 of the turning control device 50. That the start switch SW turns on means that the vehicle power source turns on. That the start switch SW turns off means that the vehicle power source turns off.

The first system circuit 41 and the second system circuit 42 of the reaction force control device 40 as well as the first system circuit 51 and the second system circuit 52 of the turning control device 50 are connected to the direct-current power source 60 through power source relays 60A, 60B, 60C, 60D. When the power source relays 60A, 60B, 60C, 60D are turned on, the electric power from the direct-current power source 60 is supplied through the power source relays 60A, 60B, 60C, 60D to the first system circuit 41 and the second system circuit 42 of the reaction force control device 40 as well as the first system circuit 51 and the second system circuit 52 of the turning control device 50.

The first system circuit 41 of the reaction force control device 40 controls turning on and off of the power source relay 60A. When the start switch SW is switched from on to off, the first system circuit 41 executes power latching control that maintains the power source relay 60A in a turned-on state for a specified period. Thus, the first system circuit 41 can operate even after the start switch SW is turned off. When the specified period has elapsed, the first system circuit 41 can shut off the power supply to itself by switching the power source relay 60A from on to off.

The first system circuit 41 detects turning on and off of the start switch SW by monitoring, for example, a voltage between both ends of the start switch SW. When the voltage between both ends of the start switch SW falls below a specified voltage threshold value, the first system circuit 41 detects that the start switch SW has been turned on. When the voltage between both ends of the start switch SW is equal to or higher than the specified voltage threshold value, the first system circuit 41 detects that the start switch SW has been turned off.

The second system circuit 42 of the reaction force control device 40 controls turning on and off of the power source relay 60B. Like the first system circuit 41, the second system circuit 42 executes the power latching control. When the start switch SW is switched from on to off, the second system circuit 42 maintains the power source relay 60B in a turned-on state for the specified period.

The first system circuit 51 of the turning control device 50 controls turning on and off of the power source relay 60C. Like the first system circuit 41 of the reaction force control device 40, the first system circuit 51 executes the power latching control. When the start switch SW is switched from on to off, the first system circuit 51 maintains the power source relay 60C in a turned-on state for the specified period.

The second system circuit 52 of the turning control device 50 controls turning on and off of the power source relay 60D. Like the first system circuit 41 of the reaction force control device 40, the second system circuit 52 executes the power latching control. When the start switch SW is switched from on to off, the second system circuit 52 maintains the power source relay 60D in a turned-on state for the specified period.

Of the constituent elements of the steering device 10, those constituent elements that are required to operate also after the start switch SW is turned off, such as the torque sensor 23, the steering angle sensor 24, and the stroke sensor 34, are connected to the direct-current power source 60 through at least one of the power source relays 60A, 60B, 60C, 60D. Therefore, even when the start switch SW is off, power supply to the constituent elements, such as the torque sensor 23, the steering angle sensor 24, and the stroke sensor 34, is continued when at least one of the power source relays 60A, 60B, 60C, 60D is on.

Reaction Force Control Device

Figure 2:
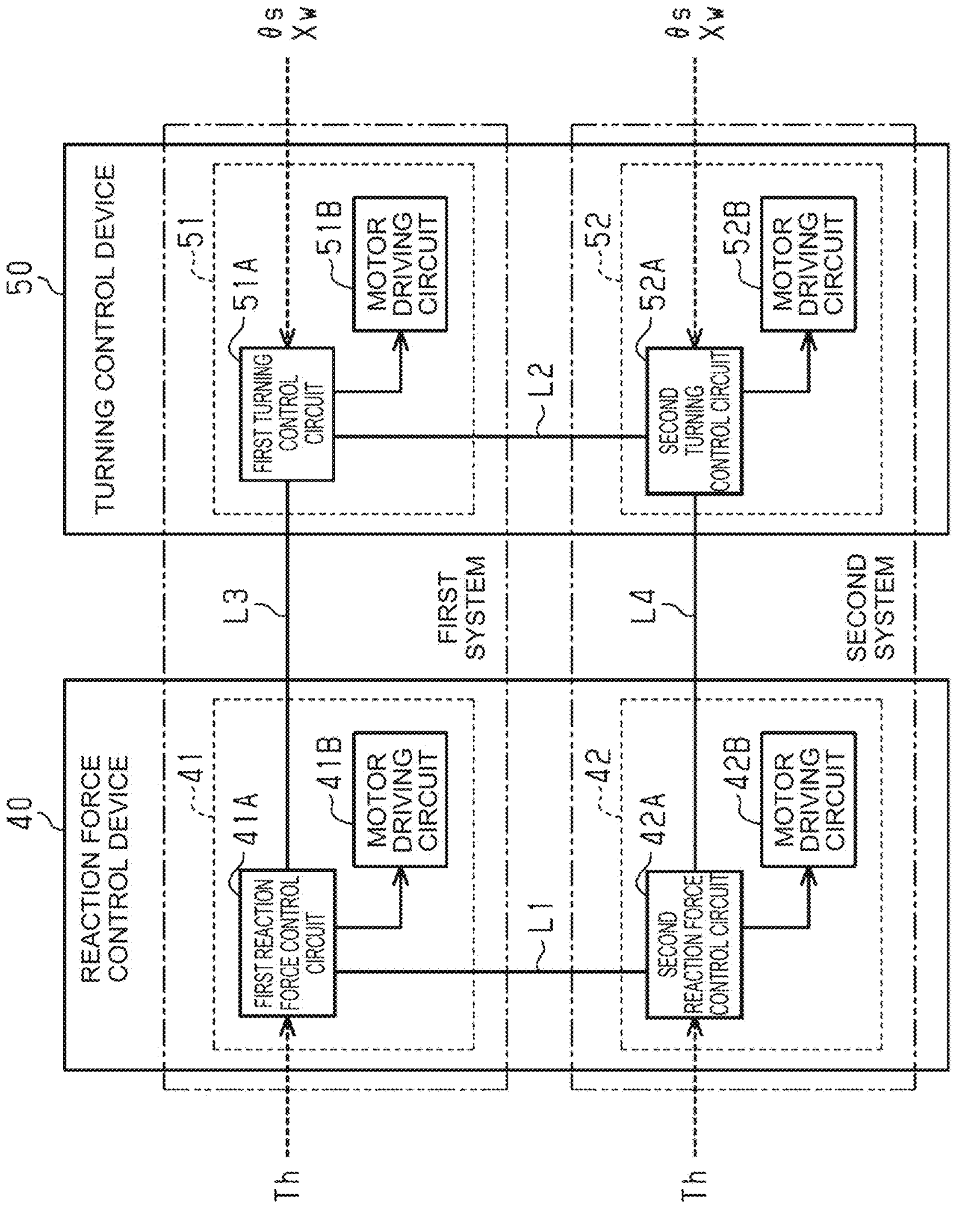
FIG. 2 is a block diagram of a reaction force control device and a turning control device of the first embodiment.

Next, the configuration of the reaction force control device will be described in detail. As shown in FIG. 2, the reaction force control device 40 has the first system circuit 41 and the second system circuit 42. The first system circuit 41 has a first reaction force control circuit 41A and a motor driving circuit 41B. The second system circuit 42 has a second reaction force control circuit 42A and a motor driving circuit 42B.

The first reaction force control circuit 41A is formed by a processing circuit including: (1) one or more processors that operate in accordance with a computer program (software); (2) one or more dedicated hardware circuits, such as application-specific integrated circuits (ASICs), that execute at least some of various processes; or (3) a combination of (1) and (2). The processor includes a central processing unit (CPU). The processor further includes memories, such as a random-access memory (RAM) and a read-only memory (ROM). The memories store program codes or commands configured to make the CPU execute processes. The term "memory," i.e., a non-transitory computer-readable medium covers all available media that can be accessed by a general- or special-purpose computer.

The first reaction force control circuit 41A calculates the target steering reaction force to be generated by the reaction force motor 21 based on the steering torque Th detected through the torque sensor 23, and calculates a first current command value for the winding set N11 of the first system according to the value of the calculated target steering reaction force. The first current command value is set to a value that is half (50%) of an amount of current (100%) required to generate the target steering reaction force in the reaction force motor 21. The first reaction force control circuit 41A generates a driving signal (PWM signal) for the motor driving circuit 41B by executing current feedback control that adapts an actual value of a current supplied to the winding set N11 of the first system to the first current command value.

The motor driving circuit 41B is a PWM inverter in which three legs corresponding to the respective three phases (U, V, W) are connected in parallel, with each leg as a basic unit being formed by two series-connected switching elements, such as field-effect transistors (FETs). The motor driving circuit 41B converts the direct-current electric power supplied from the direct-current power source 60 into three-phase alternating-current electric power as the switching elements of each phase switch based on the driving signal generated by the first reaction force control circuit 41A. The three-phase alternating-current electric power generated by the motor driving circuit 41B is supplied to the winding set N11 of the first system of the reaction force motor 21 through a power supply path of each phase that is formed by a busbar, a cable, or the like. Thus, the winding set N11 of the first system generates a torque according to the first current command value.

The second reaction force control circuit 42A has basically the same configuration as the first reaction force control circuit 41A. The second reaction force control circuit 42A calculates the target steering reaction force to be generated by the reaction force motor 21 based on the steering torque Th detected through the torque sensor 23, and calculates a second current command value for the winding set N12 of the second system according to the value of the calculated target steering reaction force. The second current command value is set to a value that is half (50%) of an amount of current required to generate the target steering reaction force in the reaction force motor 21. The second reaction force control circuit 42A generates a driving signal for the motor driving circuit 42B by executing current feedback control that adapts an actual value of a current supplied to the winding set N12 of the second system to the second current command value.

The motor driving circuit 42B has basically the same configuration as the motor driving circuit 41B. The motor driving circuit 42B converts the direct-current electric power supplied from the direct-current power source 60 into three-phase alternating-current electric power based on the driving signal generated by the second reaction force control circuit 42A. The three-phase alternating-current electric power generated by the motor driving circuit 42B is supplied to the winding set N12 of the second system of the reaction force motor 21 through a power supply path of each phase that is formed by a busbar, a cable, or the like. Thus, the winding set N12 of the second system generates a torque according to the second current command value. The reaction force motor 21 generates a torque that is a total of the torque generated by the winding set N11 of the first system and the torque generated by the winding set N12 of the second system.

There is a master-slave relationship between the first system circuit 41 and the second system circuit 42 of the reaction force control device 40. In this case, for example, the first system circuit 41 functions as the master and the second system circuit 42 functions as the slave.

Turning Control Device

Next, the configuration of the turning control device 50 will be described in detail. As shown in FIG. 2, the turning control device 50 has a first system circuit 51 and a second system circuit 52. The first system circuit 51 has a first turning control circuit 51A and a motor driving circuit 51B. The second system circuit 52 has a second turning control circuit 52A and a motor driving circuit 52B.

The first turning control circuit 51A has basically the same configuration as the first reaction force control circuit 41A. The first turning control circuit 51A calculates a target turning angle of the turning wheels 15 based on the steering angle θs detected through the steering angle sensor 24. The turning control device 50 calculates the turning angle θw based on the stroke Xw of the turning shaft 13 detected through the stroke sensor 34. The first turning control circuit 51A calculates the target turning force to be generated by the turning motor 31 through execution of angle feedback control that adapts the turning angle θw calculated based on the stroke Xw to the target turning angle, and calculates a third current command value for the winding set N21 of the first system of the turning motor 31 according to the value of the calculated target turning force. The third current command value is set to a value of half (50%) of an amount of current required to generate the target turning force by the turning motor 31. The first turning control circuit 51A generates a driving signal for the motor driving circuit 51B by executing current feedback control that adapts an actual value of a current supplied to the winding set N21 of the first system to the third current command value.

The motor driving circuit 51B has basically the same configuration as the motor driving circuit 41B. The motor driving circuit 51B converts the direct-current electric power supplied from the direct-current power source 60 into three-phase alternating-current electric power based on the driving signal generated by the first turning control circuit 51A. The three-phase alternating-current electric power generated by the motor driving circuit 51B is supplied to the winding set N21 of the first system of the turning motor 31 through a power supply path of each phase that is formed by a busbar, a cable, or the like. Thus, the winding set N21 of the first system generates a torque according to the third current command value.

The second turning control circuit 52A has basically the same configuration as the first reaction force control circuit 41A. The second turning control circuit 52A calculates the target turning angle of the turning wheels 15 based on the steering angle θs detected through the steering angle sensor 24. The turning control device 50 calculates the turning angle θw based on the stroke Xw of the turning shaft 13 detected through the stroke sensor 34. The second turning control circuit 52A calculates the target turning force to be generated by the turning motor 31 through execution of the angle feedback control that adapts the turning angle θw calculated based on the stroke Xw to the target turning angle, and calculates a fourth current command value for the winding set N22 of the second system of the turning motor 31 according to the value of the calculated target turning force. The fourth current command value is set to a value of half (50%) of an amount of current required to generate the target turning force by the turning motor 31. The second turning control circuit 52A generates a driving signal for the motor driving circuit 52B by executing current feedback control that adapts an actual value of a current supplied to the winding set N22 of the second system to the fourth current command value.

The motor driving circuit 52B has basically the same configuration as the motor driving circuit 41B. The motor driving circuit 52B converts the direct-current electric power supplied from the direct-current power source 60 into three-phase alternating-current electric power based on the driving signal generated by the second turning control circuit 52A. The three-phase alternating-current electric power generated by the motor driving circuit 52B is supplied to the winding set N22 of the second system of the turning motor 31 through a power supply path of each phase that is formed by a busbar, a cable, or the like. Thus, the winding set N22 of the second system generates a torque according to the fourth current command value. The turning motor 31 generates a torque that is a total of the torque generated by the winding set N21 of the first system and the torque generated by the winding set N22 of the second system.

There is a master-slave relationship between the first system circuit 51 and the second system circuit 52 of the turning control device 50. In this case, for example, the first system circuit 51 functions as the master and the second system circuit 52 functions as the slave.

Communication Paths

Next, communication paths inside the reaction force control device 40 and the turning control device 50, and communication paths between the reaction force control device 40 and the turning control device 50 will be described.

As shown in FIG. 2, the first reaction force control circuit 41A and the second reaction force control circuit 42A exchange information with each other through a communication line L1. The information includes abnormality information on the first reaction force control circuit 41A, the second reaction force control circuit 42A, or the motor driving circuits 41B, 42B. The information further includes values of flags that show various states. The first reaction force control circuit 41A and the second reaction force control circuit 42A control the driving of the reaction force motor 21 in a coordinated manner based on the information exchanged therebetween.

The first turning control circuit 51A and the second turning control circuit 52A exchange information with each other through a communication line L2. The information includes abnormality information on the first turning control circuit 51A, the second turning control circuit 52A, or the motor driving circuits 51B, 52B. The information further includes values of flags that show various states. The first turning control circuit 51A and the second turning control circuit 52A control the driving of the turning motor 31 in a coordinated manner based on the information exchanged therebetween.

The first reaction force control circuit 41A and the first turning control circuit 51A exchange information with each other through a communication line L3. The information includes abnormality information on the first reaction force control circuit 41A, the first turning control circuit 51A, and the motor driving circuits 41B, 51B. The information further includes values of flags that show various states. The first reaction force control circuit 41A and the first turning control circuit 51A operate in cooperation with each other based on the information exchanged therebetween.

The second reaction force control circuit 42A and the second turning control circuit 52A exchange information with each other through a communication line LA. The information includes abnormality information on the second reaction force control circuit 42A, the second turning control circuit 52A, or the motor driving circuits 42B, 52B. The information further includes values of flags that show various states. The second reaction force control circuit 42A and the second turning control circuit 52A operate in cooperation with each other based on the information exchanged therebetween.

Driving Modes of Motor

Next, driving modes of the reaction force motor 21 and the turning motor 31 will be described. The driving modes include a coordinated driving mode, an independent driving mode, and a single-system driving mode.

The coordinated driving mode is a driving mode for normal times when the first system circuits 41, 51 and the second system circuits 42, 52 are operating normally. The first system circuit 41 and the second system circuit 42 generate equivalent torques in both the winding set N11 of the first system and the winding set N12 of the second system of the reaction force motor 21 by sharing information, such as command values and limit values. The first system circuit 51 and the second system circuit 52 generate equivalent torques in both the winding set N21 of the first system and the winding set N22 of the second system of the turning motor 31 by sharing information, such as command values and limit values.

In the case where there is a master-slave relationship between the first system circuit 41 and the second system circuit 42 of the reaction force control device 40, when the coordinated driving mode is selected as the driving mode, the slave controls the driving of the reaction force motor 21 using the command value calculated by the master. In the case where there is a master-slave relationship between the first system circuit 51 and the second system circuit 52 of the turning control device 50, when the coordinated driving mode is selected as the driving mode, the slave controls the driving of the turning motor 31 using the command value calculated by the master.

The independent driving mode is a driving mode for a case where the operation of one of the four control circuits (41A, 42A, 51A, 52A) has stopped momentarily but an abnormality has not been confirmed and there is a possibility of restoration to normal operation. In the independent driving mode, for example, when there is a possibility for one control circuit that has stopped operating to be restored to the normal operation, the other three control circuits generate torques in their corresponding winding sets based on their own calculation results without using the information obtained by intersystem communication.

In the case where there is a master-slave relationship between the first system circuit 41 and the second system circuit 42 of the reaction force control device 40, when the independent driving mode is selected as the driving mode, the master-slave relationship between the first system circuit 41 and the second system circuit 42 is temporarily dissolved. In the case where there is a master-slave relationship between the first system circuit 51 and the second system circuit 52 of the turning control device 50, when the independent driving mode is selected as the driving mode, the master-slave relationship between the first system circuit 51 and the second system circuit 52 is temporarily dissolved.

The single-system driving mode is a driving mode for a case where an abnormality of one of the four control circuits (41A, 42A, 51A, 52A) has been confirmed and there is no possibility of restoration to the normal operation. For example, when abnormalities of the first system circuits 41, 51 have been confirmed, torques are generated in the reaction force motor 21 and the turning motor 31 by the second system circuits 42, 52 alone. When abnormalities of the second system circuits 42, 52 have been confirmed, torques are generated in the reaction force motor 21 and the turning motor 31 by the first system circuits 41, 51 alone.

In the case where there is a master-slave relationship between the first system circuit 41 and the second system circuit 42 of the reaction force control device 40, when the single-system driving mode is selected as the driving mode, the master-slave relationship between the first system circuit 41 and the second system circuit 42 is temporarily dissolved. In the case where there is a master-slave relationship between the first system circuit 51 and the second system circuit 52 of the turning control device 50, when the single-system driving mode is selected as the driving mode, the master-slave relationship between the first system circuit 51 and the second system circuit 52 is temporarily dissolved.

At normal times when there is no abnormality, the control circuits (41A, 42A, 51A, 52A) control the driving of the motors (21, 31) in the coordinated driving mode. When an abnormality determination condition is met in a state where the coordinated driving mode is selected as the driving mode, each control circuit switches the driving mode from the coordinated driving mode to the independent driving mode. When a restoration determination condition is met before the abnormality is confirmed in the state where the independent driving mode is selected as the driving mode, each control circuit restores the driving mode from the independent driving mode to the coordinated driving mode. When an abnormality confirmation condition is met in the state where the independent driving mode is selected as the driving mode, each control circuit switches the driving mode from the independent driving mode to the single-system driving mode.

Examples of abnormalities include temporary ones from which restoration is deemed possible, such as an abnormality in intersystem communication, an abnormality in communication within the same system, discrepancy in the command value between the systems, and a decrease in a current limit value. The abnormality determination condition is equivalent to a shift condition for shifting the driving mode from the coordinated driving mode to the independent driving mode. The restoration determination condition is equivalent to a restoration condition for restoring the driving mode from the independent driving mode or the single-system driving mode to the coordinated driving mode.

State Transitions of Control Circuits

Next, state transitions of the control circuits (41A, 42A, 51A, 52A) will be described.

When the start switch SW is turned on, each control circuit executes a start-up process and an initial check. The start-up process and the initial check are a series of processes required for a steering system to operate. The start-up process and the initial check include, for example, checking hardware, initializing the CPU, and initializing variables, flags, etc. During execution of the start-up process and the initial check, a control status of each control circuit is a non-assisting state. The non-assisting state is a state in which execution of the control of the reaction force motor 21 and the turning motor 31 is not started. The control status is an operation state of each control circuit.

After the execution of the initial check is normally completed, the control status of each control circuit shifts from the non-assisting state to a state of waiting to start assisting. The state of waiting to start assisting is a state of waiting for execution of the initial check to be normally completed in all the control circuits.

When execution of the initial check is normally completed in all the control circuits, each control circuit becomes able to execute the control of the reaction force motor 21 or the turning motor 31. The control status of each control circuit shifts from the state of waiting to start assisting to a normal control state. Each control circuit starts to execute normal control that generates the steering reaction force or the turning force according to the steering state of the steering wheel 11. In the normal control state, the driving modes of the reaction force motor 21 and the turning motor 31 are the coordinated driving mode. In the normal control state, therefore, the control circuits generate torques in both the winding set N11 of the first system and the winding set N12 of the second system of the reaction force motor 21, and generate torques in both the winding set N21 of the first system and the winding set N22 of the second system of the turning motor 31.

In the case where the control status of the control circuit is the state of waiting to start assisting or the normal control state, when the specified abnormality determination condition is met, the control status of the control circuit shifts from the state of waiting to start assisting to an independent driving mode state or a single-system driving mode state. In the case where the control status of the control circuit is the independent driving mode state, when the specified restoration condition is met, the control status of the control circuit is restored from the independent driving mode state to the normal control state. In the case where the control status of the control circuit is the independent driving mode state, when the specified abnormality confirmation condition is met, the control status of the control circuit shifts from the independent driving mode state to the single-system driving mode state.

One Example of State Transitions of Control Circuits

Next, one example of state transitions of the control circuits (41A, 42A, 51A, 52A) in the event of a first abnormality will be described. Here, a case will be taken as an example where an abnormality in the communication between the first reaction force control circuit 41A and the first turning control circuit 51A has occurred as an abnormality that leads to switching of the driving mode to the independent driving mode. Meanwhile, the communication between the first reaction force control circuit 41A and the second reaction force control circuit 42A is normal. The communication between the first turning control circuit 51A and the second turning control circuit 52A is also normal.

Figure 3:
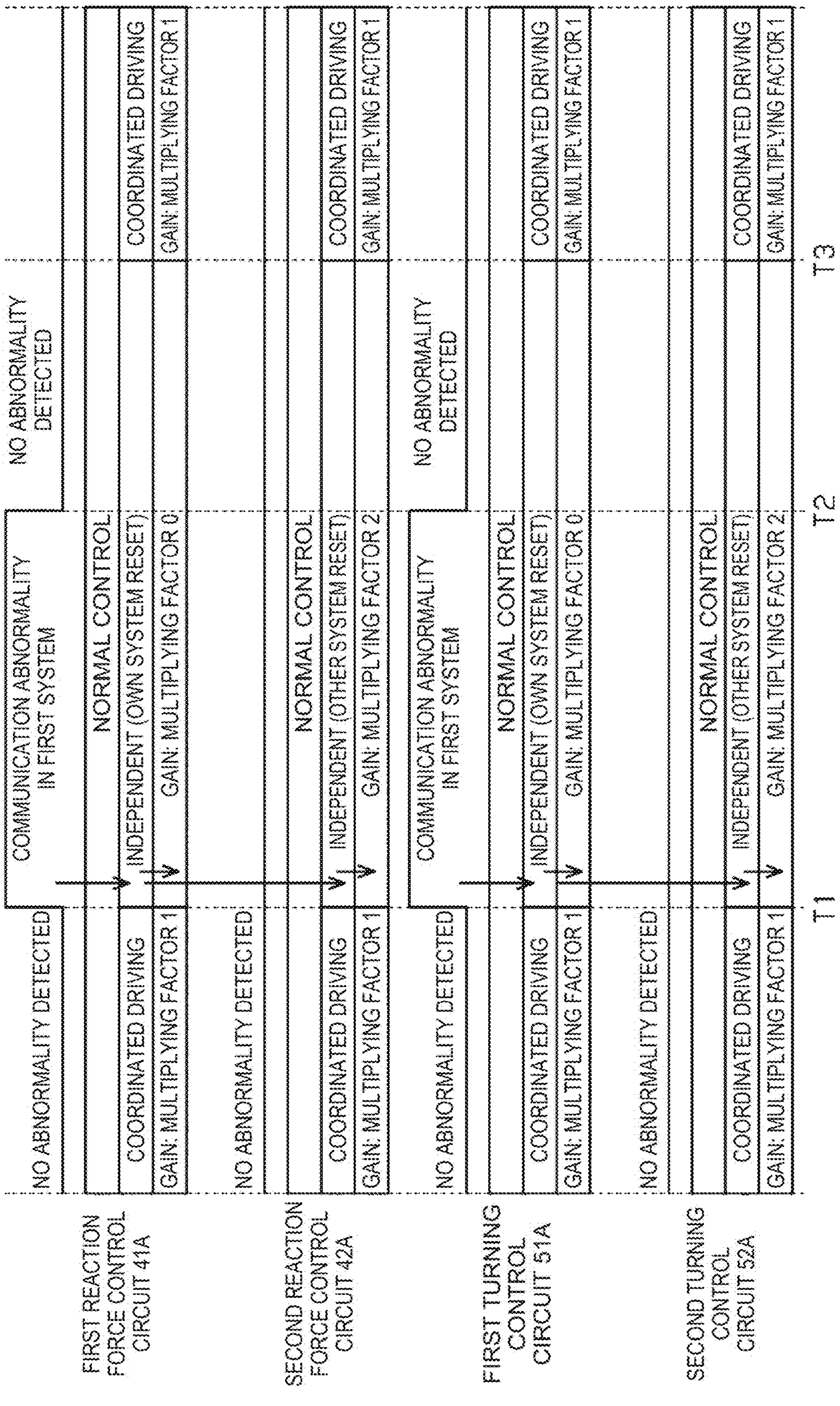
FIG. 3 is a time chart showing one example of state transitions of control circuits according to the first embodiment.

As shown in the time chart of FIG. 3, in the case where the control devices are controlling the driving of the motors (21, 31) in the coordinated driving mode, when an abnormality in the communication between the first reaction force control circuit 41A and the first turning control circuit 51A occurs (time T1), the control devices switch the driving modes as follows. The first reaction force control circuit 41A and the first turning control circuit 51A switch their driving modes from the coordinated driving mode to the independent driving mode. Further, the first reaction force control circuit 41A and the first turning control circuit 51A switch gains for the current command values that they respectively calculate from "multiplying factor 1" during the normal control to "multiplying factor 0."

As the first current command value calculated by the first reaction force control circuit 41A is multiplied by the gain "multiplying factor 0," the final first current command value becomes "0." As the third current command value calculated by the first turning control circuit 51A is multiplied by the gain "multiplying factor 0," the final third current command value also becomes "0." This means that the power supply to the winding set N11 of the first system of the reaction force motor 21 and the winding set N21 of the first system of the turning motor 31 is stopped. Therefore, the winding sets N11, N21 of the first systems do not generate torques.

The second reaction force control circuit 42A recognizes that a communication abnormality has occurred in the first system through the first reaction force control circuit 41A. The second turning control circuit 52A recognizes that a communication abnormality has occurred in the first system through the first turning control circuit 51A.

Upon recognizing that a communication abnormality has occurred in the first systems, the second reaction force control circuit 42A and the second turning control circuit 52A switch their driving modes from the coordinated driving mode to the independent driving mode. Further, the second reaction force control circuit 42A and the second turning control circuit 52A switch gains for the current command values that they respectively calculate from "multiplying factor 1" during the normal control to "multiplying factor 2."

As the second current command value calculated by the second reaction force control circuit 42A is multiplied by the gain "multiplying factor 2," the final second current command value becomes a value that is twice that at normal times. As the fourth current command value calculated by the second turning control circuit 52A is multiplied by the gain "multiplying factor 2," the final fourth current command value also becomes a value that is twice that at normal times. This means that it becomes possible to supply twice as much electric power as at normal times to the winding set N12 of the second system of the reaction force motor 21 and the winding set N22 of the second system of the turning motor 31. Therefore, the winding sets N12, N22 of the second systems can generate twice as much torque as at normal times. Thus, the amounts of decrease in the torques generated by the winding sets N11, N21 of the first systems can be compensated for by the torques generated by the winding sets N12, N22 of the second systems. However, depending on the product specifications, when the second current command value and the fourth current command value exceed a specified allowable range, these second current command value and fourth current command value may be restricted to a limit value that is set based on a limit value of the allowable range.

Here, in the case where the driving of the motors (21, 31) is controlled in the independent driving mode by the second systems, it is possible that the communication abnormality in the first systems may be resolved (time T2) before the communication abnormality in the first systems is confirmed.

When the specified restoration determination condition is met, the first reaction force control circuit 41A and the first turning control circuit 51A of the abnormal systems restore the driving modes from the independent driving mode to the coordinated driving mode (time T3). The restoration determination condition includes that the abnormality in the communication between the first reaction force control circuit 41A and the first turning control circuit 51A has been resolved. When restoring the driving modes from the independent driving mode to the coordinated driving mode, the first reaction force control circuit 41A and the first turning control circuit 51A of the abnormal systems switch the gains for the current command values that they respectively calculate from "multiplying factor 0" in the event of an abnormality to "multiplying factor 1" during the normal control.

Following this, the second reaction force control circuit 42A and the second turning control circuit 52A of the normal systems restore the driving modes from the independent driving mode to the coordinated driving mode. Further, the second reaction force control circuit 42A and the second turning control circuit 52A switch the gains for the current command values that they respectively calculate from "multiplying factor 2" in the event of an abnormality to "multiplying factor 1" during the normal control. The driving modes are synchronized with each other between the first reaction force control circuit 41A and the second reaction force control circuit 42A. The driving modes are synchronized with each other between the first turning control circuit 51A and the second turning control circuit 52A.

The restoration determination condition may include that a state where the vehicle is stationary continues for a first determination time, and that a state where the steering wheel 11 is not steered continues for a second determination time. Whether the vehicle is in a stationary state can be determined based on, for example, a vehicle speed that is detected through a vehicle speed sensor. Examples of situations where the steering wheel 11 is not steered include a steering state where the vehicle is moving straight forward, and a steering situation where the vehicle is performing steady turning. Whether the steering wheel 11 is being steered is determined based on, for example, the steering torque Th.

One Example of Possible Abnormalities of Control Circuits

Next, one example of possible abnormalities of the control circuits (41A, 42A, 51A, 52A) will be described.

There is a concern that the following abnormality may occur in the control devices. Here, for example, a case where an abnormality occurs in the communication between the first turning control circuit 51A and the second turning control circuit 52A when the control circuits (41A, 42A, 51A, 52A) start as the vehicle power source is turned on will be described as one example. However, abnormalities include a case where, due to a delay in starting of the first turning control circuit 51A and the second turning control circuit 52A, the first reaction force control circuit 41A and the second reaction force control circuit 42A that have started earlier each detect a communication abnormality.

Figure 4:
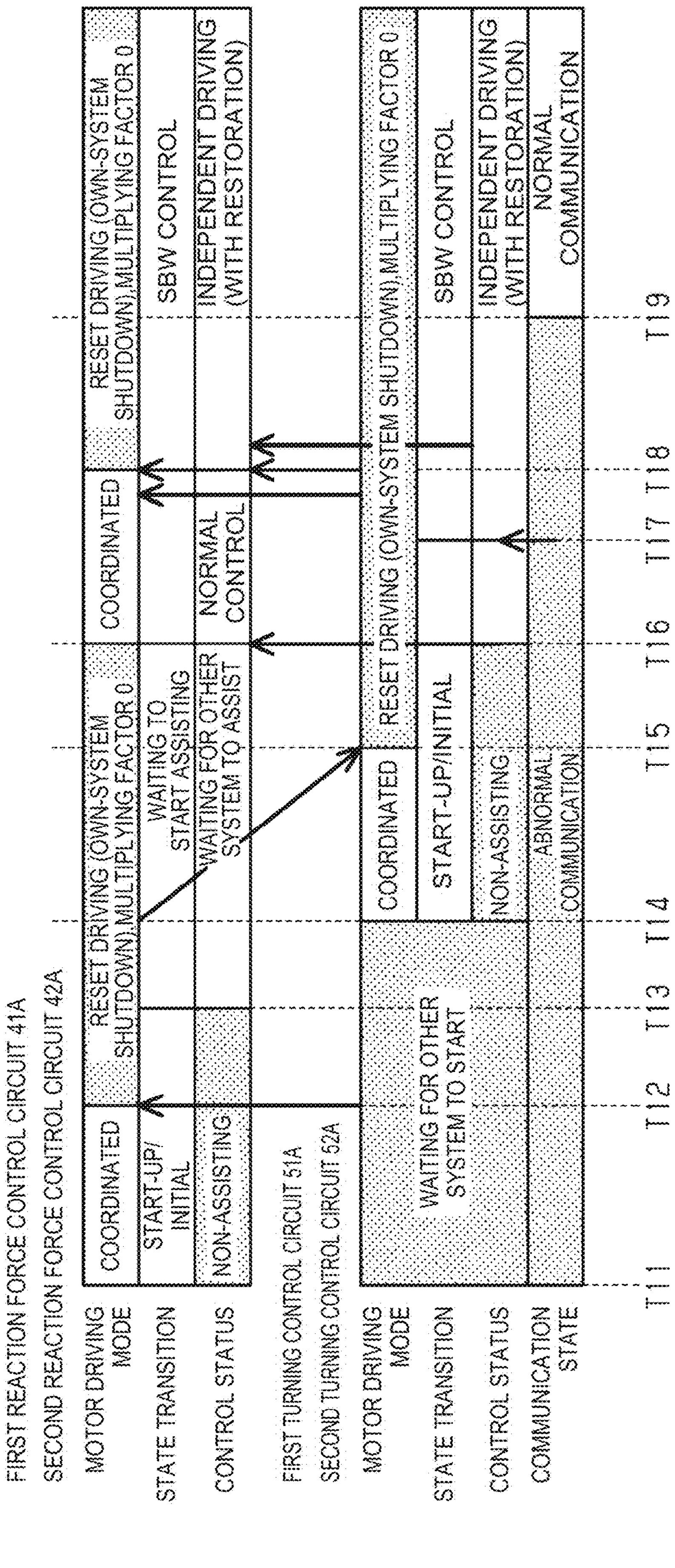
FIG. 4 is a time chart showing one example of possible abnormalities in the control circuits according to the first embodiment.

As shown in the time chart of FIG. 4, in the case where, for example, there is an abnormality in the communication between the first turning control circuit 51A and the second turning control circuit 52A when the vehicle power source is turned on (time T11), the control status of the first turning control circuit 51A becomes a state of waiting for the other system to start. The other system is the second turning control circuit 52A. As with the first turning control circuit 51A, the control status of the second turning control circuit 52A also becomes the state of waiting for the other system to start. The other system is the first turning control circuit 51A.

When the vehicle power source is turned on (time T11), the first reaction force control circuit 41A executes the start-up process and the initial check. During execution of the start-up process and the initial check, the control status of the first reaction force control circuit 41A is the non-assisting state.

During execution of the start-up process or the initial check, the first reaction force control circuit 41A monitors the operation state of the first turning control circuit 51A. This is based on a viewpoint of controlling the driving of the reaction force motor 21 in synchronization with the control of the turning motor 31 by the first turning control circuit 51A. In the example of FIG. 4, since the first turning control circuit 51A has not started, the first reaction force control circuit 41A shifts the driving mode of the reaction force motor 21 from the coordinated driving mode to the own-system shutdown mode (time T12). That is, the first reaction force control circuit 41A switches the gain for the first current command value that it calculates from "multiplying factor 1" during the normal control to "multiplying factor 0." When the execution of the initial check is normally completed, the first reaction force control circuit 41A shifts the control status to a state of waiting for the other system to start assisting (time T13).

When the state of waiting for the other system to start has continued for a specified period, the first turning control circuit 51A executes the start-up process and the initial check (time T14). During the execution of the start-up process and the initial check, the control status of the first turning control circuit 51A is the non-assisting state. However, the first turning control circuit 51A acquires the driving mode of the reaction force motor 21 from the first reaction force control circuit 41A, and synchronizes the driving mode of the turning motor 31 with the acquired driving mode (time T15). That is, the first turning control circuit 51A shifts the driving mode of the turning motor 31 from the coordinated driving mode to the own-system shutdown mode. The first turning control circuit 51A switches the gain for the third current command value that it calculates from "multiplying factor 1" during the normal control to "multiplying factor 0."

When the execution of the initial check is normally completed (time T16), the first turning control circuit 51A shifts the control status to the state of waiting for the other system to start assisting. However, since the communication between the first turning control circuit 51A and the second turning control circuit 52A is abnormal, the first turning control circuit 51A is not communicating with the second turning control circuit 52A. Therefore, the first turning control circuit 51A shifts the control status from the state of waiting for the other system to start assisting to the independent driving mode (time T17).

When the execution of the initial check by the first turning control circuit 51A is completed (time T16), the first reaction force control circuit 41A deems that the first turning control circuit 51A has started, and shifts the control status from the state of waiting for the other system to start assisting to the normal control state. Further, the first reaction force control circuit 41A shifts the driving mode of the reaction force motor 21 from the own-system shutdown mode to the coordinated driving mode.

However, the first reaction force control circuit 41A acquires the driving mode of the turning motor 31 and the control status from the first turning control circuit 51A (time T18). The first reaction force control circuit 41A synchronizes the control status of the first reaction force control circuit 41A with the acquired control status of the first turning control circuit 51A. That is, the first reaction force control circuit 41A shifts the control status from the normal control state to the independent driving state. Further, the first reaction force control circuit 41A synchronizes the driving mode of the reaction force motor 21 with the acquired driving mode. That is, the first reaction force control circuit 41A shifts the driving mode of the reaction force motor 21 from the coordinated driving mode to the own-system shutdown mode. The first reaction force control circuit 41A switches the gain for the first current command value that it calculates from "multiplying factor 1" during the normal control to "multiplying factor 0."

At this point, the gain of the first reaction force control circuit 41A and the gain of the first turning control circuit 51A are both "multiplying factor 0." For example, in the case where the communication between the first turning control circuit 51A and the second turning control circuit 52A is restored to the normal state (time T19) before the communication abnormality is confirmed, the state where the gains are "multiplying factor 0" is maintained.

The second reaction force control circuit 42A executes a process similar to that of the first reaction force control circuit 41A. The second turning control circuit 52A executes a process similar to that of the first turning control circuit 51A. The information exchanged between the first reaction force control circuit 41A and the first turning control circuit 51A is information similar to the information exchanged between the second reaction force control circuit 42A and the second turning control circuit 52A. Therefore, a situation can arise where the gain of the second reaction force control circuit 42A and the gain of the second turning control circuit 52A both become "multiplying factor 0." Thus, a situation can arise where the gains of the four control circuits (41A, 42A, 51A, 52A) all become "multiplying factor 0." In the case where the communication between the first turning control circuit 51A and the second turning control circuit 52A is restored to the normal state before the communication abnormality is confirmed, the state where all the gains are "multiplying factor 0" is maintained.

When the gains of the four control circuits (41A, 42A, 51A, 52A) all become "multiplying factor 0," it becomes difficult to apply the steering reaction force to the steering wheel 11 and to apply the turning force to the turning wheels 15. Thus, it becomes difficult to execute appropriate reaction force control and to execute appropriate turning control. In this embodiment, therefore, to appropriately respond to such an abnormality, the following two configurations are adopted for the control circuits (41A, 42A, 51A, 52A).

First Configuration

First, a first configuration will be described. Before the control status shifts to the normal control state, the control circuits (41A, 42A, 51A, 52A) do not execute the process of determining whether to shift the driving modes of the motors (21, 31) to the own-system shutdown mode. This is because even when a communication abnormality occurs before the driving mode shifts to the normal control state, this poses no safety problems. Therefore, even when, for example, an abnormality in intersystem communication occurs before the driving mode shifts to the normal control state, the control status does not shift to the own-system shutdown mode, i.e., the gain does not switch to "multiplying factor 0." One specific example is as follows.

Figure 5:
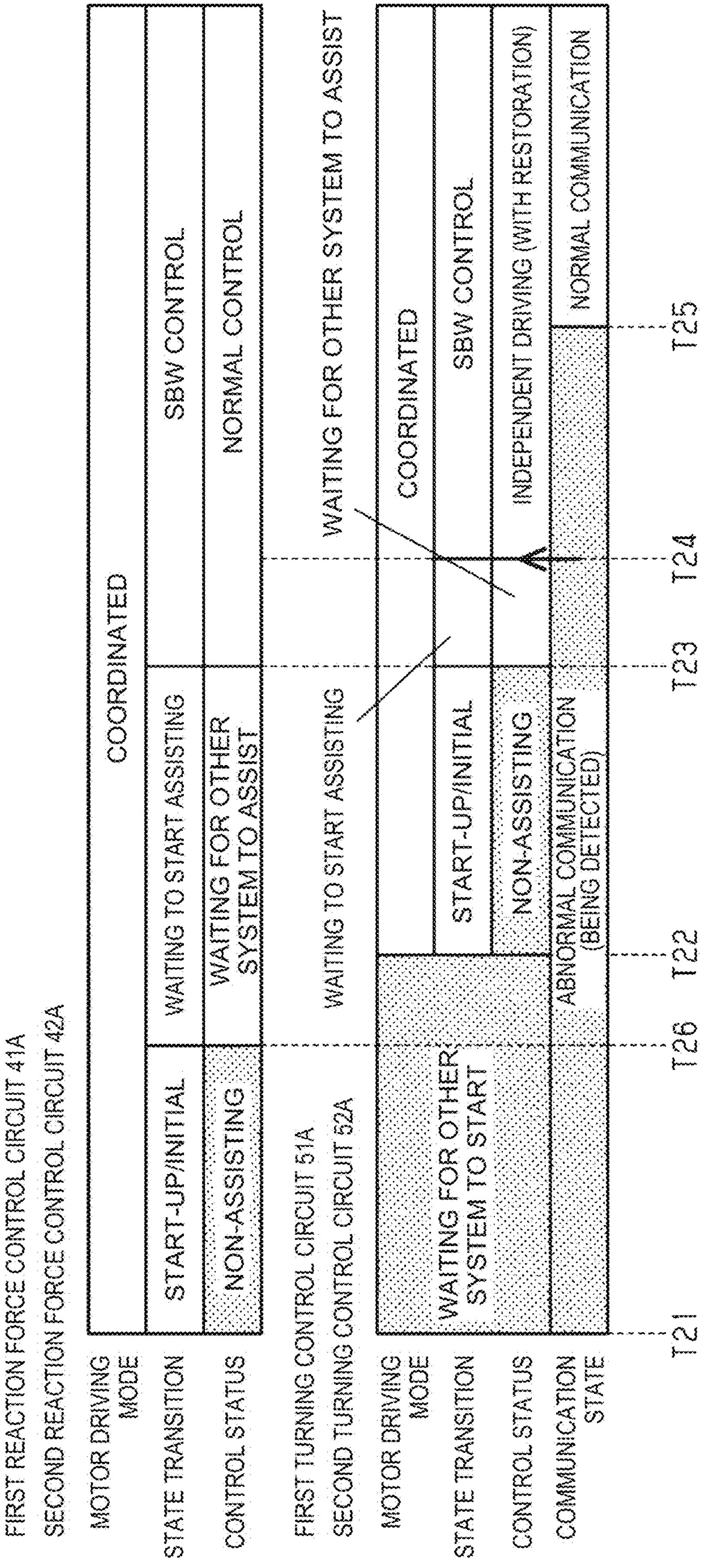
FIG. 5 is a time chart showing one example of the state transitions of the control circuits according to the first embodiment.

As shown in the time chart of FIG. 5, in the case where, for example, there is an abnormality in the communication between the first turning control circuit 51A and the second turning control circuit 52A when the vehicle power source is turned on (time T21), the control status of the first turning control circuit 51A becomes the state of waiting for the other system to start.

When the state of waiting for the other system to start has continued for a specified period (time T22), the first turning control circuit 51A executes the start-up process and the initial check. During execution of the start-up process and the initial check, the control status of the first turning control circuit 51A is the non-assisting state. The driving mode of the turning motor 31 is the coordinated driving mode.

When the execution of the initial check is normally completed (time T23), the first turning control circuit 51A executes Steer-By-Wire (SBW) control (time T24). The SBW control here is the turning control. Further, the first turning control circuit 51A shifts the control status to the state of waiting for the other system to start assisting. However, since the communication between the first turning control circuit 51A and the second turning control circuit 52A is abnormal, the first turning control circuit 51A is not communicating with the second turning control circuit 52A. Therefore, the first turning control circuit 51A shifts the control status from the state of waiting for the other system to start assisting to the independent driving mode (time T24). As the driving mode of the turning motor 31, the coordinated driving mode is maintained.

Thereafter, in some cases, the communication between the first turning control circuit 51A and the second turning control circuit 52A is restored to the normal state before the communication abnormality is confirmed (time T25). The second turning control circuit 52A executes a process similar to that of the first turning control circuit 51A. After completion of the execution of the initial check, the control status of the second turning control circuit 52A shifts to the independent driving mode via the state of waiting to start assisting. As the driving mode of the turning motor 31, the coordinated driving mode is maintained.

When the vehicle power source is turned on (time T21), the first reaction force control circuit 41A executes the start-up process and the initial check. During the execution of the start-up process and the initial check, the control status of the first reaction force control circuit 41A is the non-assisting state. Although the first turning control circuit 51A has not started, since the control status is before shifting to the normal control state, the first reaction force control circuit 41A does not execute the process of determining whether to shift the driving mode to the own-system shutdown mode. Therefore, even when the first turning control circuit 51A has not started, the driving mode does not shift to the own-system shutdown mode and the coordinated driving mode is maintained. Thus, the gain for the first current command value that the first reaction force control circuit 41A calculates is not switched from “multiplying factor 1” during the normal control to “multiplying factor 0.”

When the execution of the initial check is completed (time T26), the first reaction force control circuit 41A shifts the control status from the non-assisting state to the state of waiting for the other system to start assisting. When the execution of the initial check by the first turning control circuit 51A is completed (time T23), the first reaction force control circuit 41A deems that the first turning control circuit 51A has started, and executes the SBW control. The SBW control here is the reaction force control. Further, the first reaction force control circuit 41A shifts the control status from the state of waiting for the other system to start assisting to the normal control state. The driving mode of the reaction force motor 21 is the coordinated driving mode.

The second reaction force control circuit 42A executes a process similar to that of the first reaction force control circuit 41A. After completion of the execution of the initial check, the control status of the second reaction force control circuit 42A shifts to the normal control state via the state of waiting for the other system to start assisting. As the driving mode of the reaction force motor 21, the coordinated driving mode is maintained.

In this way, even in the case where an abnormality occurs in the communication between the first turning control circuit 51A and the second turning control circuit 52A when the control circuits (41A, 42A, 51A, 52A) start as the vehicle power source is turned on, the driving modes of the reaction force motor 21 and the turning motor 31 do not shift to the own-system shutdown mode. Thus, the gains of the control circuits do not all become “multiplying factor 0.” Even in the case where the communication between the first turning control circuit 51A and the second turning control circuit 52A is restored to the normal state before the communication abnormality is confirmed, the coordinated driving mode is maintained as the driving modes of the reaction force motor 21 and the turning motor 31.

The above description also applies to a case where an abnormality occurs in the communication between the first reaction force control circuit 41A and the second reaction force control circuit 42A when the control circuits (41A, 42A, 51A, 52A) start as the vehicle power source is turned on.

Abnormalities are not limited to abnormalities in inter-system communication. Abnormalities include a case where the first reaction force control circuit 41A and the second reaction force control circuit 42A are delayed in starting as a result of simultaneously executing the reset process at the time of starting. In this case, the first turning control circuit 51A and the second turning control circuit 52A that start earlier each detect a communication abnormality. Abnormalities include a case where the first turning control circuit 51A and the second turning control circuit 52A are delayed in starting as a result of simultaneously executing the reset process at the time of starting. In this case, the first reaction force control circuit 41A and the second reaction force control circuit 42A that start earlier each detect a communication abnormality.

Second Configuration

Next, a second configuration will be described. In the case where an unintended combination of the gains occurs during execution of the normal control, the control circuits (41A, 42A, 51A, 52A) transmit a notification signal S1 showing to that effect to the vehicle controller 90. One specific example is as follows.

Figure 6:
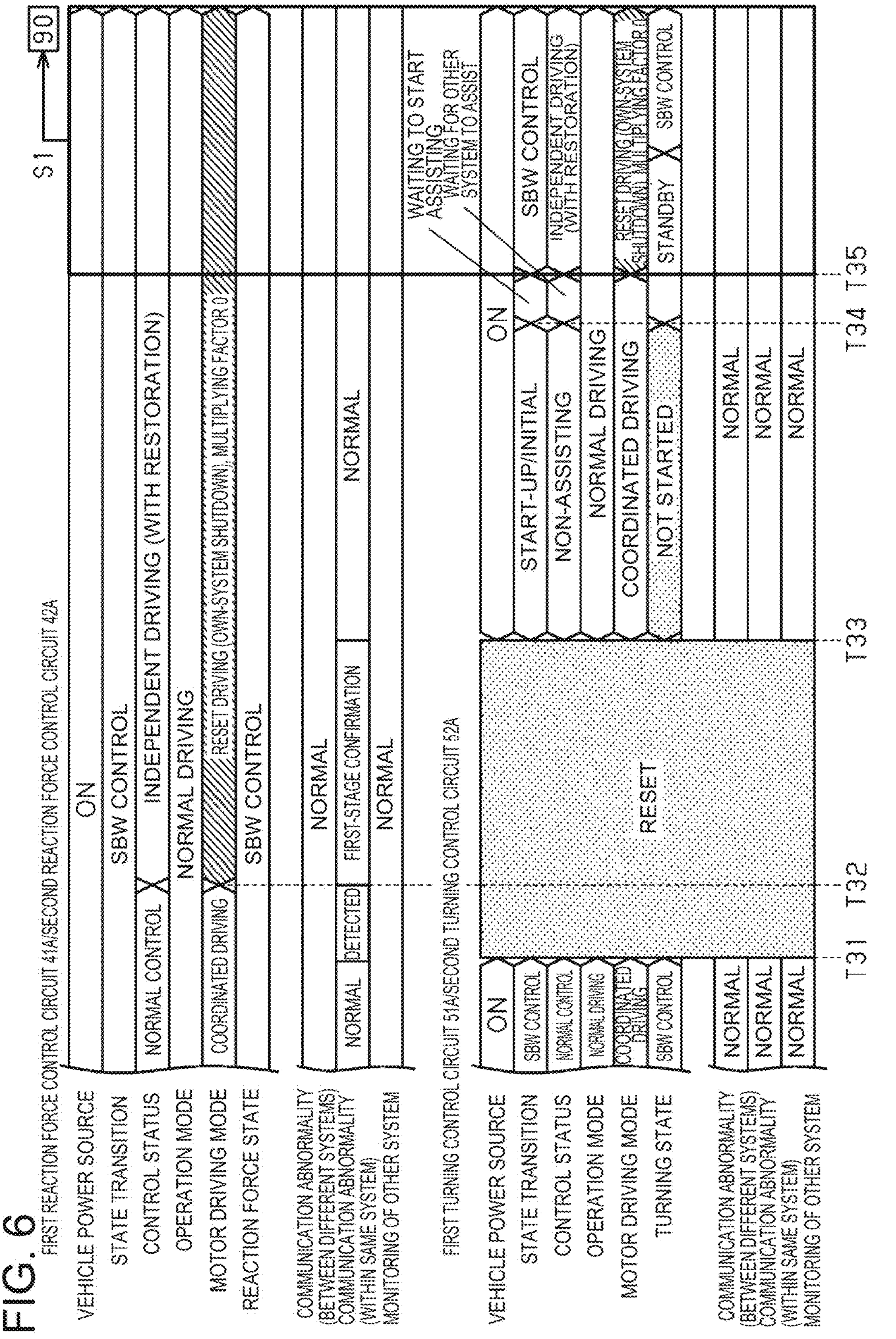
FIG. 6 is a time chart showing one example of the state transitions of the control circuits according to the first embodiment.

As shown in the time chart of FIG. 6, in the case where the control circuits (41A, 42A, 51A, 52A) are executing the normal control, for example, the first turning control circuit 51A and the second turning control circuit 52A are reset at the same time (time T31).

In this case, since the first turning control circuit 51A has not started, the first reaction force control circuit 41A shifts the control status from the normal control state to the independent driving state. Further, the first reaction force control circuit 41A shifts the driving mode of the reaction force motor 21 from the coordinated driving mode to the own-system shutdown mode (time T32). That is, the first reaction force control circuit 41A switches the gain for the first current command value that it calculates from “multiplying factor 1” during the normal control to “multiplying factor 0.”

The second reaction force control circuit 42A executes a process similar to that of the first reaction force control circuit 41A. Since the second turning control circuit 52A has not started, the second reaction force control circuit 42A shifts the control status from the normal control state to the independent driving state. Further, the second reaction force control circuit 42A shifts the driving mode of the reaction force motor 21 from the coordinated driving mode to the own-system shutdown mode. That is, the second reaction force control circuit 42A switches the gain for the second current command value that it calculates from “multiplying factor 1” during the normal control to “multiplying factor 0.”

After completion of the reset, the first turning control circuit 51A executes the start-up process and the initial check (time T33). When the execution of the initial check is normally completed (time T34), the first turning control circuit 51A goes through a period of waiting to start assisting and executes the SBW control (time T35). The SBW control here is the turning control.

However, the first turning control circuit 51A acquires the driving mode of the reaction force motor 21 and the control status from the first reaction force control circuit 41A. The first turning control circuit 51A synchronizes the control status of the first turning control circuit 51A with the acquired control status of the first reaction force control circuit 41A. That is, the first turning control circuit 51A shifts the control status from the normal control state to the independent driving state. Further, the first turning control circuit 51A synchronizes the driving mode of the turning motor 31 with the acquired driving mode of the reaction force motor 21. That is, the first turning control circuit 51A shifts the driving mode of the turning motor 31 from the coordinated driving mode to the own-system shutdown mode. The first turning control circuit 51A switches the gain for the third current command value that it calculates from “multiplying factor 1” during the normal control to “multiplying factor 0.”

The second turning control circuit 52A executes a process similar to that of the first turning control circuit 51A. After completion of the reset, the second turning control circuit 52A executes the start-up process and the initial check. When the execution of the initial check is normally completed, the second turning control circuit 52A goes through a period of waiting to start assisting and executes the SBW control. The second turning control circuit 52A synchronizes the control status of the second turning control circuit 52A with the acquired control status of the second reaction force control circuit 42A. That is, the second turning control circuit 52A shifts the control status from the normal control state to the independent driving state. Further, the second turning control circuit 52A synchronizes the driving mode of the turning motor 31 with the acquired driving mode of the reaction force motor 21. That is, the second turning control circuit 52A shifts the driving mode of the turning motor 31 from the coordinated driving mode to the own-system shutdown mode. The second turning control circuit 52A switches the gain for the fourth current command value that it calculates from "multiplying factor 1" during the normal control to "multiplying factor 0."

Therefore, the gains of the four control circuits (41A, 42A, 51A, 52A) all become "multiplying factor 0." That all the gains become "multiplying factor 0" means that an unintended combination of the gains occurs. In this case, at least one of the four control circuits generates the notification signal S1 and transmits the generated notification signal S1 to the vehicle controller 90.

The vehicle controller 90 controls, for example, traveling of the vehicle. Specifically, the vehicle controller 90 controls, for example, a powertrain of the vehicle. The powertrain includes the travel driving source and the power transmission mechanism of the vehicle. The travel driving source includes, for example, an engine or a motor. The power transmission mechanism is a mechanism for transmitting motive power generated by the travel driving source to the driving wheels.

Upon receiving the notification signal S1, the vehicle controller 90 executes a specified process. Examples of the process include a vehicle stopping process for safely stopping the vehicle. The vehicle stopping process includes a process for automatically stopping the vehicle inside a lane. The vehicle stopping process includes an automatic retreating process that, regardless of the driver's driving state, makes the vehicle pull over to a safe place, such as a road shoulder, and stop automatically. The vehicle controller 90 can recognize an environment around the vehicle through cameras and sensors installed in the vehicle. Through the execution of the vehicle stopping process, the vehicle stops safely.

The process may further include a notification process for notifying the driver of occurrence of an abnormality. The notification process may include a process for notifying occurrence of an abnormality by appealing to the driver's visual sense through an on-board display device. The notification process may include a process for notifying occurrence of an abnormality by appealing to the driver's auditory sense through an on-board speaker. The driver can recognize occurrence of an abnormality through a visual sensation or an auditory sensation. In addition, the driver can be prompted to take action in the event of an abnormality.

Advantages of First Embodiment

The first embodiment offers the following advantages.

(1-1)

Even when the operation state of the control circuit of the system other than the own system is abnormal, each of the control circuits (41A, 42A, 51A, 52A) does not shift the driving mode to the own-system shutdown mode when the own operation state is the specific operation state in which safety problems are deemed unlikely. Examples of abnormalities include a communication abnormality due to a delay in starting when the vehicle power source is turned on, and a communication abnormality accompanying resetting of the control circuits. According to this configuration, even when the operation state of the control circuit of the system other than the own system is abnormal, each control circuit does not shift the driving mode to the own-system shutdown mode when the own operation state is the specific operation state in which safety problems are deemed unlikely. Therefore, each control circuit can appropriately respond to an abnormality of the control circuit of the system other than the own system according to the own operation state.

(1-2)

The control circuits (41A, 42A, 51A, 52A) execute the start-up process and the initial check as the vehicle power source is turned on. Each control circuit monitors the operation state of the control circuit of the system other than the own system from a viewpoint of controlling the driving of the reaction force motor 21 or the turning motor 31 in synchronization with the control circuit of the other system. The specific operation state in which the driving mode is not shifted to the own-system shutdown mode is the state of executing the start-up process or the initial check. As in this configuration, safety problems are deemed unlikely during execution of the start-up process and the initial check. Therefore, even when the operation state of the control circuit of the system other than the own system is abnormal, the driving mode can be prevented from shifting to the own-system shutdown mode.

(1-3)

The control circuits (41A, 42A, 51A, 52A) synchronize the driving modes with each other. The control circuits can communicate with the vehicle controller 90 that controls the vehicle. When, while each control circuit is controlling the reaction force motor 21 or the turning motor 31, the operation state of the control circuit of the system other than the own system is abnormal, the control circuit shifts the driving mode to the own-system shutdown mode. When the driving modes of the control circuits have all shifted to the own-system shutdown mode through the aforementioned synchronization, the control circuits transmit the notification signal S1 showing to that effect to the vehicle controller 90. Therefore, the vehicle controller 90 can recognize, based on the notification signal S1, that the reaction force motor 21 and the turning motor 31 are being difficult to drive.

One example of the case where the driving modes of the control circuits all shift to the own-system shutdown mode is a case where the first turning control circuit 51A and the second turning control circuit 52A are reset at the same time while the first reaction force control circuit 41A and the second reaction force control circuit 42A are each controlling the driving of the reaction force motor 21. Another example of the case where the driving modes of the control circuits all shift to the own-system shutdown mode is a case where the first reaction force control circuit 41A and the second reaction force control circuit 42A are reset at the same time while the first turning control circuit 51A and the second turning control circuit 52A are each controlling the driving of the turning motor 31.

(1-4)

The first reaction force control circuit 41A and the first turning control circuit 51A are in the relationship of monitoring each other's operation state. The second reaction force control circuit 42A and the second turning control circuit 52A are in the relationship of monitoring each other's operation state. According to this configuration, even when the operation state of the first turning control circuit 51A that is the control circuit of the system other than the own system is abnormal, the first reaction force control circuit 41A does not shift the driving mode to the own-system shutdown mode when the own operation state is the specific operation state in which safety problems are deemed unlikely. Therefore, the first reaction force control circuit 41A can appropriately respond to an abnormality of the first turning control circuit 51A according to the own operation state. Even when the operation state of the first reaction force control circuit 41A that is the control circuit of the system other than the own system is abnormal, the first turning control circuit 51A does not shift the driving mode to the own-system shutdown mode when the own operation state is the specific operation state in which safety problems are deemed unlikely. Therefore, the first turning control circuit 51A can appropriately respond to an abnormality of the first reaction force control circuit 41A according to the own operation state. The same applies to the second reaction force control circuit 42A and the second turning control circuit 52A.

Second Embodiment

Next, a second embodiment in which the vehicle control device is embodied as an electric power-assisted steering device will be described. The same members as in the first embodiment will be denoted by the same reference signs and detailed description thereof will be omitted.

In the electric power-assisted steering device, the steering wheel 11 and the turning wheels 15 shown earlier in FIG. 1 are mechanically coupled together. That is, the steering shaft 12, the pinion shaft 33, and the turning shaft 13 function as a power transmission path between the steering wheel 11 and the turning wheels 15. As the steering wheel 11 is steered, the turning shaft 13 performs a linear movement, and thereby the turning angle θw of the turning wheels 15 is changed.

The electric power-assisted steering device has an assistance motor and an assistance control device. The assistance motor is provided at the same position as the reaction force motor 21 or the turning motor 31 shown earlier in FIG. 1. The assistance motor generates an assistive force for assisting the operation of the steering wheel 11. The assistive force is a torque in the same direction as the operation direction of the steering wheel 11. The assistance control device controls driving of the assistance motor that is a control target.

Figure 7:
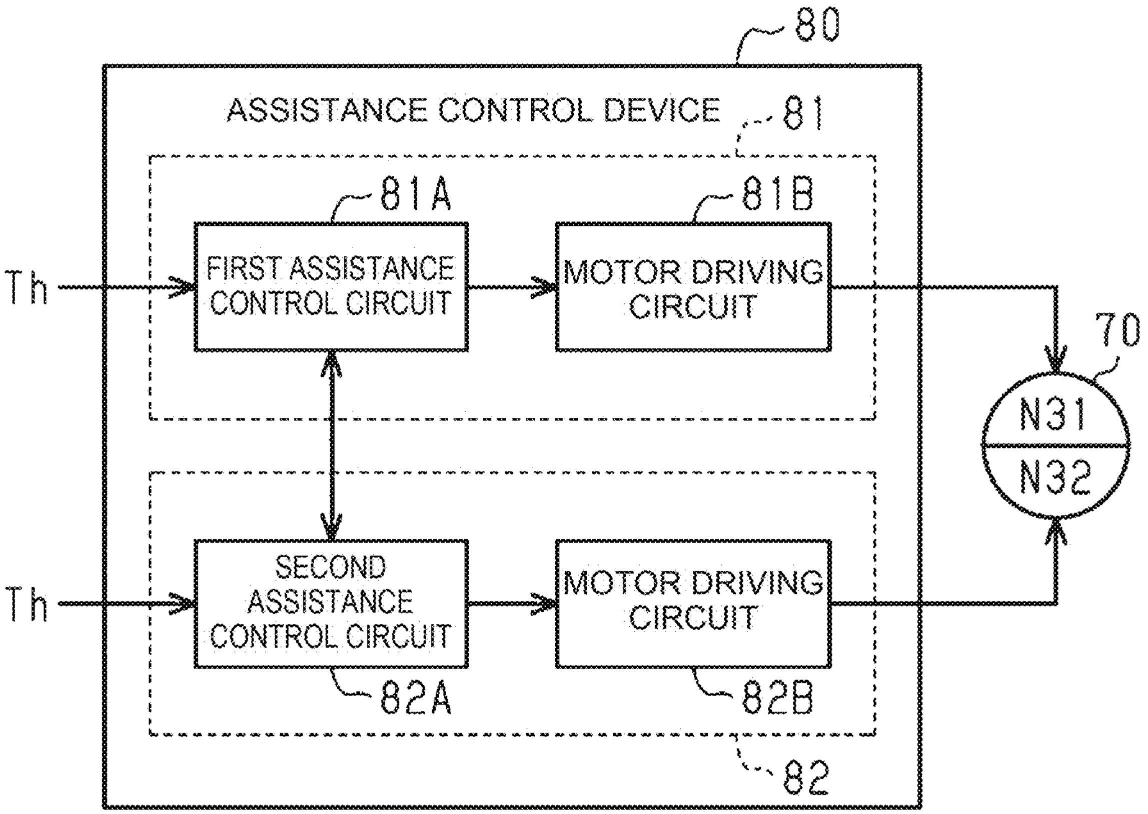
FIG. 7 is a configuration diagram of a second embodiment of the vehicle control device.

As shown in FIG. 7, an assistance motor 70 has a winding set N31 of a first system and a winding set N32 of a second system. An assistance control device 80 has a first system circuit 81. The first system circuit 81 has a first assistance control circuit 81A and a motor driving circuit 81B. The first assistance control circuit 81A controls power supply to the winding set N31 of the first system. The first assistance control circuit 81A generates a driving signal for the motor driving circuit 81B based on the steering torque Th detected through the torque sensor 23.

The motor driving circuit 81B converts the direct-current electric power supplied from the direct-current power source 60 into three-phase alternating-current electric power based on the driving signal generated by the first assistance control circuit 81A. The three-phase alternating-current electric power generated by the motor driving circuit 81B is supplied to the winding set N31 of the first system of the assistance motor 70 through a power supply path of each phase that is formed by a busbar, a cable, or the like.

The assistance control device 80 has a second system circuit 82. The second system circuit 82 has a second assistance control circuit 82A and a motor driving circuit 82B. The second assistance control circuit 82A controls power supply to the winding set N32 of the second system. The second assistance control circuit 82A generates a driving signal for the motor driving circuit 82B based on the steering torque Th detected through the torque sensor 23.

The motor driving circuit 82B converts the direct-current electric power supplied from the direct-current power source 60 into three-phase alternating-current electric power based on the driving signal generated by the second assistance control circuit 82A. The three-phase alternating-current electric power generated by the motor driving circuit 82B is supplied to the winding set N32 of the second system of the assistance motor 70 through a power supply path of each phase that is formed by a busbar, a cable, or the like.

The first assistance control circuit 81A and the second assistance control circuit 82A exchange information with each other through a communication line. The information includes abnormality information on the first assistance control circuit 81A, the second assistance control circuit 82A, or the motor driving circuits 81B, 82B. The information further includes values of various flags. The first assistance control circuit 81A and the second assistance control circuit 82A control the driving of the assistance motor 70 in a coordinated manner based on the information exchanged therebetween.

The first assistance control circuit 81A has basically the same configuration as the first reaction force control circuit 41A or the second reaction force control circuit 42A shown in FIG. 2. The second assistance control circuit 82A has basically the same configuration as the first turning control circuit 51A or the second turning control circuit 52A shown in FIG. 2. Like the control circuits (41A, 42A, 51A, 52A) in the first embodiment, the first assistance control circuit 81A and the second assistance control circuit 82A control the driving of the assistance motor 70 in one driving mode among the coordinated driving mode, the independent driving mode, and the single-system driving mode.

In the case where an abnormality occurs in the communication between the first assistance control circuit 81A and the second assistance control circuit 82A when the vehicle power source is turned on, the first assistance control circuit 81A and the second assistance control circuit 82A execute the following process. The first assistance control circuit 81A executes a process similar to that of the first reaction force control circuit 41A or the second reaction force control circuit 42A in the first embodiment shown in FIG. 5. The second assistance control circuit 82A executes a process similar to that of the first turning control circuit 51A or the second turning control circuit 52A in the first embodiment shown in FIG. 5.

In the case where, for example, the second assistance control circuit 82A is reset while the first assistance control circuit 81A and the second assistance control circuit 82A are executing the normal control, the first assistance control circuit 81A and the second assistance control circuit 82A execute the following process. The first assistance control circuit 81A executes a process similar to that of the first reaction force control circuit 41A or the second reaction force control circuit 42A in the first embodiment shown in FIG. 6. The second assistance control circuit 82A executes a process similar to that of the first turning control circuit 51A or the second turning control circuit 52A in the first embodiment shown in FIG. 6.

Thus, the second embodiment offers the following advantages.

(2-1)

Even when the operation state of the second assistance control circuit 82A that is the control circuit of the system other than the own system is abnormal, the first assistance control circuit 81A does not shift the driving mode to the own-system shutdown mode when the own operation state is the specific operation state in which safety problems are deemed unlikely. Therefore, the first assistance control circuit 81A can appropriately respond to an abnormality of the second assistance control circuit 82A according to the own operation state. Even when the operation state of the first assistance control circuit 81A that is the control circuit of the system other than the own system is abnormal, the second assistance control circuit 82A does not shift the driving mode to the own-system shutdown mode when the own operation state is the specific operation state in which safety problems are deemed unlikely. Therefore, the second assistance control circuit 82A can appropriately respond to an abnormality of first assistance control circuit 81A according to the own operation state.

(2-2)

The control circuits (81A, 82A) execute the start-up process and the initial check as the vehicle power source is turned on. Each control circuit monitors the operation state of the control circuit of the system other than the own system from a viewpoint of controlling the driving of the assistance motor 70 in synchronization with the control circuit of the other system. The specific operation state in which the driving mode is not shifted to the own-system shutdown mode is the state where the start-up process or the initial check is being executed. As in this configuration, safety problems are deemed unlikely while the start-up process and the initial check are executed. Therefore, even when the operation state of the control circuit of the system other than the own system is abnormal, the driving mode can be prevented from shifting to the own-system shutdown mode.

(2-3)

The control circuits (81A, 82A) synchronize the driving modes with each other. The control circuits are configured to be able to communicate with the vehicle controller 90 that controls the vehicle. When, while each control circuit is controlling the driving of the assistance motor 70, the operation state of the control circuit of the system other than the own system is abnormal, the control circuit shifts the driving mode to the own-system shutdown mode. When the driving modes of the control circuits have all shifted to the own-system shutdown mode through the aforementioned synchronization, the control circuits transmit the notification signal S1 showing to that effect to the vehicle controller 90. Therefore, the vehicle controller 90 can recognize, based on the notification signal S1, that the assistance motor 70 is being difficult to drive.

One example of the case where the driving modes of the control circuits all shift to the own-system shutdown mode is a case where the second assistance control circuit 82A is reset while the first assistance control circuit 81A is controlling the driving of the assistance motor 70. Another example of the case where the driving modes of the control circuits all shift to the own-system shutdown mode is a case where the first assistance control circuit 81A is reset while the second assistance control circuit 82A is controlling the driving of the assistance motor 70.

OTHER EMBODIMENTS

The embodiments may be implemented with the following changes made thereto. In the first embodiment, the first reaction force control circuit 41A and the second reaction force control circuit 42A may determine whether the steering wheel 11 is being steered. Whether the steering wheel 11 is being steered is determined based on, for example, the steering torque Th. In the case where the first current command value and the second current command value are both "0" despite the steering wheel 11 being steered, the first reaction force control circuit 41A and the second reaction force control circuit 42A determine that the state is an abnormal state in which the steering reaction force is not applied to the steering wheel 11, and transmit the notification signal S1 showing to that effect to the vehicle controller 90. Thus, the vehicle controller 90 can recognize, based on the notification signal S1, that the state is the abnormal state in which the steering reaction force is not applied to the steering wheel 11. Upon recognizing the abnormal state, the vehicle controller 90 may execute, for example, the vehicle stopping process for safely stopping the vehicle or the notification process for notifying the driver of occurrence of the abnormality.

In the first embodiment, the reaction force motor 21 and the turning motor 31 have the winding sets of the two systems, but may instead have a winding set of one system. In this case, the reaction force control device 40 may have only either the first system circuit 41 or the second system circuit 42. In this case, the turning control device 50 may have only either the first system circuit 51 or the second system circuit 52. The first reaction force control circuit 41A or the second reaction force control circuit 42A corresponds to the reaction force control circuit. The first turning control circuit 51A or the second turning control circuit 52A corresponds to the turning control circuit. This configuration can produce advantages similar to the advantages (2-1) to (2-3) of the second embodiment. The first assistance control circuit 81A should be read as the reaction force control circuit, while the second assistance control circuit 82A should be read as the turning control circuit.

In the first embodiment, the vehicle control device is embodied as the steer-by-wire steering device, and in the second embodiment, the vehicle control device is embodied as the electric power-assisted steering device. The vehicle control device may also be embodied as, for example, an electric door mirror device that opens and closes in conjunction with locking of a door after the vehicle power source is turned off. The vehicle control device can be embodied as any vehicle control devices that have redundant control circuits and motor driving circuits. For example, the redundant control circuits may be required to be synchronized with each other in their state transition.

What is claimed is:

1. A vehicle control device comprising a plurality of control circuits of a plurality of systems each configured to calculate a current command value according to a torque to be generated by a motor that has winding sets of the plurality of systems, and to independently control power supply to the winding set of a corresponding one of the plurality of systems based on the calculated current command value, wherein:

the control circuits are each configured to drive the motor in one of driving modes that are switched according to an operation state of the control circuit of a system other than an own system;

the driving modes include an own-system shutdown mode in which the power supply to the winding set of the own system is stopped when the operation state of the control circuit of a system other than the own system is abnormal; and the control circuits are each configured such that, even when the operation state of the control circuit of a system other than the own system is abnormal, the control circuit does not shift the driving mode to the own-system shutdown mode when an own operation state is a specific operation state in which safety problems are deemed unlikely.

2. The vehicle control device according to claim 1, wherein:

the control circuits are each configured to execute a start-up process and an initial check as a vehicle power source is turned on, and to monitor the operation state of the control circuit of a system other than the own system from a viewpoint of controlling the driving of the motor in synchronization with the control circuit of the other system; and the specific operation state is a state of executing the start-up process or the initial check.

3. The vehicle control device according to claim 1, wherein:

the plurality of control circuits is configured to synchronize the driving modes with one another, and to communicate with a vehicle controller configured to control a vehicle; and the control circuits are each configured such that, when, while the control circuit is controlling the driving of the motor, the operation state of the control circuit of a system other than the own system is abnormal, the control circuit shifts the driving mode to the own-system shutdown mode, and such that, when the driving modes of the plurality of control circuits have all shifted to the own-system shutdown mode through the synchronization, the control circuit transmits a notification signal showing that effect to the vehicle controller.

4. The vehicle control device according to claim 1, wherein:

the motor includes:

a reaction force motor having winding sets of two systems, the reaction force motor being configured to generate a steering reaction force to be applied to a steering wheel from which power transmission to a turning wheel is cut off; and a turning motor having winding sets of two systems, the turning motor being configured to generate a turning force for turning the turning wheel;

the plurality of control circuits includes:

a first reaction force control circuit configured to control power supply to the reaction force motor;

a second reaction force control circuit configured to control the power supply to the reaction force motor;

a first turning control circuit configured to control power supply to the turning motor; and a second turning control circuit configured to control the power supply to the turning motor; and the first reaction force control circuit and the first turning control circuit are in a relationship of monitoring each other's operation state, while the second reaction force control circuit and the second turning control circuit are in a relationship of monitoring each other's operation state.

5. The vehicle control device according to claim 1, wherein:

the motor includes:

a reaction force motor having a winding set of one system, the reaction force motor being configured to generate a steering reaction force to be applied to a steering wheel from which power transmission to a turning wheel is cut off; and a turning motor having a winding set of one system, the turning motor being configured to generate a turning force for turning the turning wheel; and the plurality of control circuits includes:

a reaction force control circuit configured to control power supply to the reaction force motor; and a turning control circuit configured to control power supply to the turning motor.

6. The vehicle control device according to claim 1, wherein:

the motor is an assistance motor configured to generate an assistive force for assisting operation of a steering wheel;

the assistance motor has a winding set of a first system and a winding set of a second system; and the plurality of control circuits includes:

a first assistance control circuit configured to control power supply to the winding set of the first system; and a second assistance control circuit configured to control power supply to the winding set of the second system.

7. The vehicle control device according to claim 4, wherein the first reaction force control circuit, the second reaction force control circuit, the first turning control circuit, and the second turning control circuit are each formed of a processor and/or a hardware circuit.

8. The vehicle control device according to claim 5, wherein the reaction force control circuit and the turning control circuit are each formed of a processor and/or a hardware circuit.

9. The vehicle control device according to claim 6, wherein the first assistance control circuit and the second assistance control circuit are each formed of a processor and/or a hardware circuit.

10. The vehicle control device according to claim 1, wherein in the own-system shutdown mode, the power supply to the winding set of the own system is stopped upon receiving a notification, from the system other than the own system, that the operation state of the control circuit of the system other than the own system is abnormal, regardless of an operation state of the control circuit of the own system being normal.

* * * * *